(12) United States Patent
Beuerlein

(10) Patent No.: US 9,327,428 B2
(45) Date of Patent: May 3, 2016

(54) CASTING MOLD COMPRISING A BREATHER

(76) Inventor: Werner Beuerlein, Volkach (DE)

(*) Notice: Subject to any disclaimer, the term of this patent is extended or adjusted under 35 U.S.C. 154(b) by 0 days.

(21) Appl. No.: 13/381,330

(22) PCT Filed: Jun. 17, 2010

(86) PCT No.: PCT/DE2010/000684
§ 371 (c)(1),
(2), (4) Date: Mar. 1, 2012

(87) PCT Pub. No.: WO2011/000344
PCT Pub. Date: Jan. 6, 2011

(65) Prior Publication Data
US 2012/0146261 A1    Jun. 14, 2012

(30) Foreign Application Priority Data
Jul. 2, 2009   (DE) .......................... 10 2009 031 453

(51) Int. Cl.
*B29C 33/10* (2006.01)
*B22C 9/06* (2006.01)
*B22D 17/14* (2006.01)

(52) U.S. Cl.
CPC ................. *B29C 33/10* (2013.01); *B22C 9/067* (2013.01); *B22D 17/145* (2013.01); *B22C 9/065* (2013.01)

(58) Field of Classification Search
CPC ........ B29C 33/10; B29C 45/63; B29C 49/62; B29C 47/763; B29C 37/006; B29C 44/588; Y10S 425/812
USPC .......................................... 425/546; 249/141
See application file for complete search history.

(56) References Cited

U.S. PATENT DOCUMENTS

| | | | | |
|---|---|---|---|---|
| 1,918,532 A | * | 7/1933 | Geyer | ...................... B29C 45/02 425/577 |
| 2,669,769 A | * | 2/1954 | Peterson | ................. B21K 23/00 164/120 |
| 2,785,448 A | | 3/1957 | Hodler | |
| 3,098,268 A | * | 7/1963 | Zifferer | ...................... B22C 9/03 164/16 |

(Continued)

FOREIGN PATENT DOCUMENTS

| | | |
|---|---|---|
| DE | 151209 | 5/1904 |
| DE | 1044364 B | 11/1958 |

(Continued)

OTHER PUBLICATIONS

Kazmer, David O., Injection Mold Design Engineering, Hanser Publishers, 2007, pp. 185-197.*

(Continued)

*Primary Examiner* — Matthew Daniels
(74) *Attorney, Agent, or Firm* — Westman, Champlin & Koehler, P.A.

(57) ABSTRACT

Disclosed is a casting mold comprising at least two adjoining molds that enclose a hollow space, the cavity, which is accessible from the outside via at least one inlet duct and into which liquid casting material can be injected or pressed, and at least one vent opening that extends from the cavity to the outer surface of a mold, points approximately in the direction in which the hardened cast part is removed from the mold, and is closed by a pin-type breather. The face of the breather facing the cavity is perforated by small air holes which are permeable to air while retaining the liquid casting material and which are connected to the outer surface of the breather.

11 Claims, 1 Drawing Sheet

(56) References Cited

U.S. PATENT DOCUMENTS

| | | | | |
|---|---|---|---|---|
| 3,230,590 | A | * | 1/1966 | Schaible ................ B22C 7/005 164/242 |
| 3,377,662 | A | * | 4/1968 | Fukushima ................... 425/401 |
| 4,026,512 | A | * | 5/1977 | Holt ........................ B29C 33/10 138/40 |
| 4,081,225 | A | * | 3/1978 | Yaita ..................... B29C 67/222 249/141 |
| 4,721,279 | A | * | 1/1988 | Oleszko ................. B29C 33/10 249/141 |
| 4,740,150 | A | * | 4/1988 | Sayer ................. B29C 45/1704 264/513 |
| 4,795,331 | A | * | 1/1989 | Cain et al. .................... 425/28.1 |
| 4,946,363 | A | * | 8/1990 | Cavender ............... B29C 33/10 249/141 |
| 5,282,730 | A | * | 2/1994 | Daniels et al. ................. 425/130 |
| 5,560,695 | A | * | 10/1996 | Pufpaff .................. B29C 33/10 312/401 |
| 5,874,116 | A | * | 2/1999 | Takano ................... B29C 45/34 264/102 |
| 6,042,354 | A | * | 3/2000 | Loren ........................... 425/130 |
| 6,280,176 | B1 | * | 8/2001 | Boyce et al. ................... 425/546 |
| 6,367,765 | B1 | * | 4/2002 | Wieder ......................... 249/141 |
| 6,871,831 | B1 | * | 3/2005 | Cuny et al. .................... 249/141 |
| 7,607,908 | B2 | * | 10/2009 | Seroka ......................... 425/28.1 |
| 7,654,817 | B2 | * | 2/2010 | Yagi et al. ..................... 425/472 |
| 8,342,830 | B2 | * | 1/2013 | Sugata ......................... 425/28.1 |
| 2003/0030188 | A1 | * | 2/2003 | Spengler ....................... 264/458 |

FOREIGN PATENT DOCUMENTS

| | | |
|---|---|---|
| DE | 1 147 718 | 4/1963 |
| DE | 24 16 405 A1 | 10/1975 |
| DE | 25 03 021 A1 | 7/1976 |
| DE | 31 52 917 T1 | 2/1983 |
| DE | 3938086 C2 | 7/1996 |
| DE | 19628166 A1 | 1/1998 |
| DE | 298 15 545 U1 | 1/1999 |
| DE | 10 2005 0558 07 A1 | 6/2006 |
| DE | 10 2006 013 912 A1 | 9/2007 |
| DE | 10 2006 035 927 A1 | 2/2008 |
| DE | 60 2005 006142 T2 | 7/2009 |
| EP | 0 515 038 A2 | 4/1992 |
| JP | 1 358 329 | 7/1974 |
| JP | 60092085 A | 5/1985 |
| JP | 61038768 A | 2/1986 |
| JP | 61038769 A | 2/1986 |
| WO | 2004/067256 A1 | 8/2004 |

OTHER PUBLICATIONS

Campo, E. Alfredo, Complete Part Design Handbook, Hanser Publishers, 2006, pp. 690-697.*

International Search Report for PCT Application No. PCT/DE2010/000684, dated Jan. 3, 2011, 6 pages.

Written Opinion of International Search Report for PCT Application No. PCT/DE2010/000684, dated Jan. 3, 2011, 8 pages.

International Preliminary Report on Patentability for PCT Application No. PCT/DE2010/000684, dated Feb. 3, 2012, 27 pages.

Translation of International Preliminary Report on Patentability for PCT Application No. PCT/DE2010/000684, 12 pages.

* cited by examiner

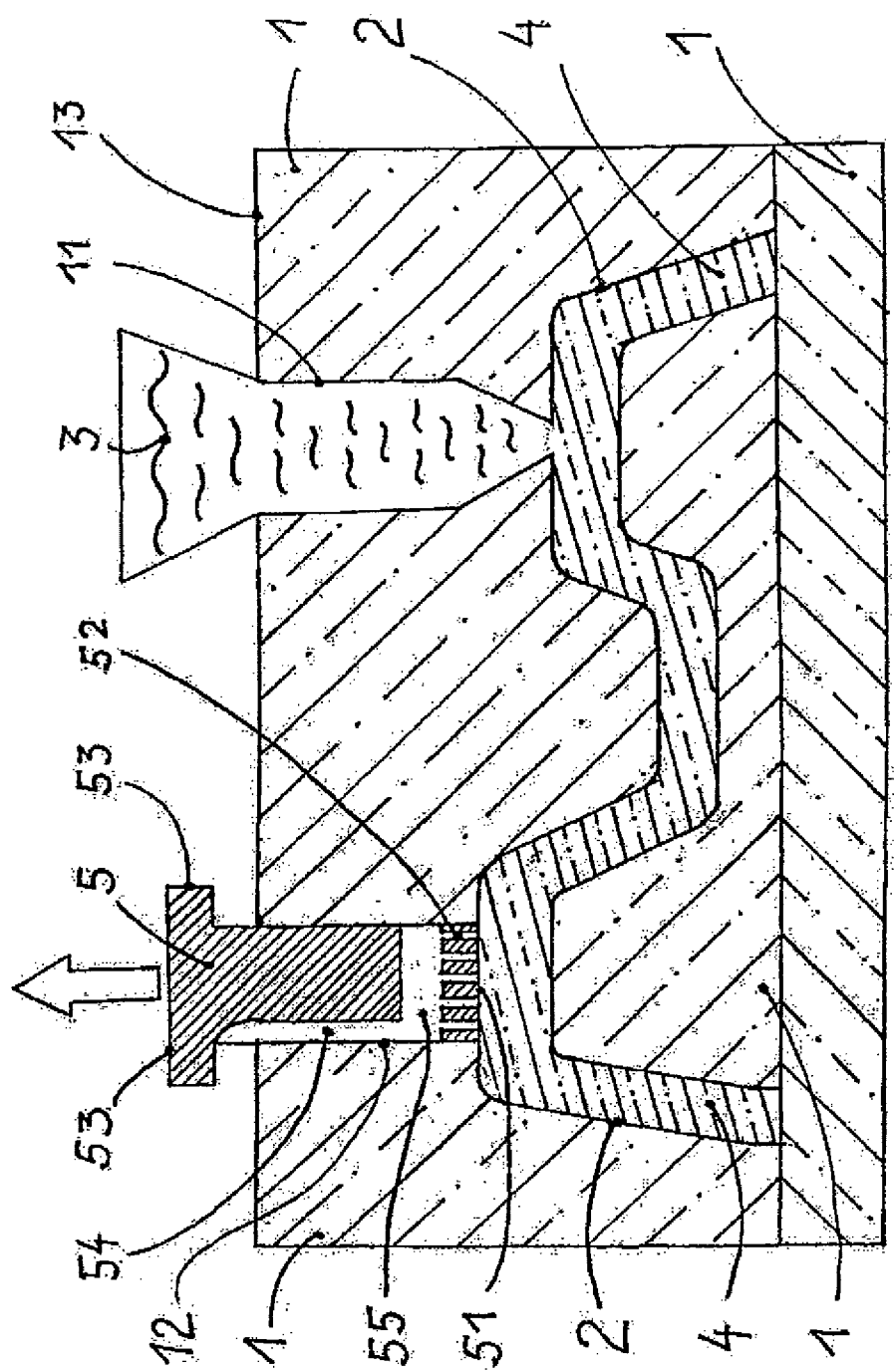

CASTING MOLD COMPRISING A BREATHER

CROSS-REFERENCE TO RELATED APPLICATION

This application is a Section 371 National Stage Application of International Application No. PCT/DE2010/000684, filed Jun. 17, 2010 and published as WO 2011/000344 on Jan. 6, 2011, in German, the contents of which are hereby incorporated by reference in their entirety.

The invention relates to a casting mould consisting of at least two adjoining moulds, which enclose a hollow space, the cavity, which is accessible externally via at least one inlet channel, and into which a liquid casting material can be injected or pressed, and at least one vent opening, which runs from the cavity as far as the outer surface of a mould, and which is closed by means of a breather.

For manufacturing cast parts from liquid casting material, such as liquid plastic or liquid metal, a casting mould is required, into which the liquid casting material is injected or pressed, hardens and is finally removed from the mould.

In the processing of thermosets or rubber, the material is introduced into the cavity as a powder or paste, where it is liquefied by an appropriate pressure and an appropriate temperature. It then cures after the reduction of pressure and temperature.

During casting of the mould, the air contained therein must escape, otherwise cavities—that is to say hollow spaces—form in the cast part. A few large or a multiplicity of small pores, slots or notches might also form in the surface of the cast part. In some circumstances, the cast material might not flow together completely, or such high compression might occur that the cast material is partly burnt—that is to say reacts with oxygen in the air bubble. Therefore openings for the air to escape must be created in the casting mould.

For this purpose a small clearance between the adjacent mould parts of the casting mould, as described, for example, in German patent DE 151209, is widely known. By means of small spacer lugs on the contacting surfaces of the individual moulds, a narrow air gap is created. The disadvantage of this gap, however, is that liquid casting material can penetrate therein, as a result of which unattractive flash forms on the finished casting. The air gap should therefore be as small as possible, so that only very little cast material can penetrate into it. Then, however, the escape of the air is slowed, so that cavities can possibly form in the casting again.

The venting of dome-like parts of the cast part is more difficult. If these domes must be disposed very remote from the parting lines of the individual moulds, the path taken by air bubbles from these domes as far as the venting slits in the parting regions can be so long that bubbles remain within the dome and the cast part then becomes a reject.

Against this background, it is the object of the invention to develop an aid for casting moulds for complete venting during pouring of the casting material into the mould.

As a solution to this problem, the invention teaches that the end face of the breather facing the cavity is permeated by small air holes, which are permeable to air, but hold back the liquid casting material, and which are in connection with the outer surface of the breather.

The decisive feature of the invention is the partial barrier effect of the air holes, which prevent the large and crosslinked molecules of the casting material from passing through the holes, but are large enough to allow air to pass through. The principal advantage of this material barrier according to the invention is that it manages without mechanisms, without special materials or complicated manufacturing processes, but only consists of a large number of fine bores. In the prior art, these bores can be produced relatively rapidly and inexpensively, for example by means of laser beams. The focusing of the beams is so accurate that the diameters of the bores or channels can be calibrated to several micrometers. By this means, the desired separation of air and casting material is possible with uniform precision, even across a multiplicity of breathers.

In particular in dome-like rising or otherwise upwardly directed sections of a casting mould, in which air would otherwise collect as in a diving bell, a breather according to the invention can be placed at the highest rising point, and the volume of air collecting there during injection of the casting material can be let out upwards without a flash, a bead or another undesirable projection forming here as a result of casting material building up after cooling, which, after casting has to be removed again, for example by expensive manual secondary working, or by machining, for example by means of a CNC-controlled flash removal machine, which is only available for a high investment sum, and requires programming by experienced, and therefore expensive, personnel for each new workpiece.

Breathers according to the invention are primarily suitable for plastic injection moulding or metal die casting, in which the liquid casting material is a liquid plastic or a liquid metal.

So that this liquid material does not escape through the air holes in the breather, the air holes must have a diameter of less than 0.1 millimeters. The result of this is that they must be very numerous in order to allow a significant volume of air to pass.

Depending on the viscosity of the liquid material, the air holes are even smaller in some circumstances. For many known plastics, a diameter of the air holes of approximately 30 micrometers is classified as the best value.

In practice it is of great advantage if the air holes according to the invention have a cross-section that is uniform along their entire length or that enlarges outwardly. By this means the flow resistance for the escaping air is as low as possible, which minimizes the time for the escape of the air, and consequently reduces the risk of cavity formation in the casting.

If the cross-section of the air holes is not narrowed in their progression, there is a chance that particles that have penetrated into the air hole can escape outwards through the air hole. They can be at least forced outward again by applying compressed air to the air hole, so that the air hole is accessible again and the breather can be used without restriction over a relatively long time.

In this point, the vent according to the invention differs essentially from metal foams, a nonwoven fabric of metal fibres, laminated wire nets, porous ceramics or other media, which are also air permeable but, due to changes of the cross-section of the air guides, result in a relatively much higher flow resistance, and are very much more likely to be blocked by contamination.

The multiplicity of fine air holes can be implemented as channels from the inner end face of the breather to the outer surface. It is to be preferred, however, that these very fine air channels are only very short and are connected to a few larger, or a single common air channel, which leads to the outer surface.

In one embodiment, the breather consists of a tube, the cavity of which serves as an air channel for outflow of the air displaced from the cavity of the casting mould, and is closed off with respect to the cavity of the casting mould by means of a disc. Air and casting material are then separated at the end face of this disc, into which fine air holes according to the invention are introduced.

In another embodiment, the breather is a bolt, which, close to its end face, is penetrated by a cross bore which extends transversely to its longitudinal axis. The small air holes pass from the end face as far as the cross bore. The bolt is laterally flattened from the cross bore as far as its outer surface. This flattening and the wall of the vent opening form an air channel, through which the escaping air flows.

The bolt can have a cylindrical cross-section. However, other profiles, such as a square, a hexagon, stellar profile with sharp or rounded edges, or cross-sections of any arbitrary shape are conceivable.

The bolt can be made in one piece. That is an advantage, for example in the case of bolts that are very highly loaded during ejection.

In an alternative embodiment, however, the bolt is multi-partite in design. In this case, a modular system can be created, which allows a large number of variants to be reduced to a very small number of individual components, from which the bolt that is required can only be made up on installation. It is appropriate to subdivide the bolt into the three individual components of head, with the outer surface, centre portion and air-channel portion with air holes.

The air channel portion contains a multiplicity of air holes, which run from its end face that faces into the cavity as far as a vent channel on that side disposed opposite the end face. This vent channel is, for the most part, sealed again on assembly of the air channel portion with the centre portion, and is then equivalent to the cross-bore of the one-piece design.

Another very interesting embodiment of a breather according to the invention also supports the removal of the cured part from the mould, which is often problematic, particularly in the aforementioned dome-like regions of a cast part.

In practice, a breather, which is additionally used for ejection, usually takes the form of a bolt or a pin. Depending on the application, however, it can also be formed as a plate, a ring or a sleeve.

Depending on the application, only a portion of all breathers can additionally be used as an ejector. It is quite conceivable that, for example, only every second breather also serves as an ejector in a dual function.

In particular, if the side walls of a dome-like region of a cast part form a very small angle with one another, that is to say run parallel to one another, the static friction in the mould during removal is very high. If the cast part is removed from the mould, this dome-like region can be torn off in the worst case, which not only leads to the exchange of this particular casting, but also requires complicated manual cleaning.

It is therefore known in the prior art, to use pin-like ejectors in such regions, the inner face of which terminates flush with the inner face of the casting mould.

Under very high injection pressures, the cross-sectional area of the pins can be larger towards the inner side than towards the outer side, so that the pins cannot be forced out even at the very highest pressure values. However, the diameter of an ejector at the outside is usually somewhat larger than in the shaft. Pins with a uniform profile over their length are therefore also conceivable, in which the shape and size of the end face facing the cavity are the same as those of the outer surface.

To remove the cast part from the mould, an elevated pressure is applied to the outside of the ejector, for example by a hammer blow, so that the cast part is released from the mould and can be ejected.

The outlay for incorporating such an ejector into the mould is high. With an inaccurate fit of the pin in its receiving bore, flash formation or—in the case of a faulty axial alignment—defects or even holes in the cast part can occur. Nevertheless, an ejector is indispensable for relatively complex cast parts.

A problem of the breather according to the invention is that it often must be disposed in the vicinity of or even at the same point of the mould as the ejector in order to completely vent the mould during casting. The arrangement of two elements in this region leads to a weakening of the mould and an unnecessary complication.

Another idea of the invention is to combine the function of venting during casting with the function of ejection by means of ejectors. By this means, at critical regions of a cast part, only one opening is required instead of the two as in the prior art, as a result of which the outlay during manufacture of the moulds is significantly reduced and the possibility of defective castings due to incorrectly positioned portions of the casting mould is halved.

An advantage is that the mechanical stability that is essential for ejection is hardly reduced by the introduction of the additional air holes, since the air holes are only very small and are preferably disposed in the centre of the pin-shaped ejector. As is known, a tube has only slightly lower stiffness to forces in the axial direction than a solid cylinder of the same diameter.

A further advantage of this configuration is that cooling air blown onto the casting mould externally can pass through the air guide in the ejector directly onto the cast material, and thereby reinforce the cooling effect.

One embodiment provides for an air channel in the ejector, which leads from the inner end face of the ejector that faces the cavity as far as the outer surface thereof, and is sealed on the end face with a disc, into which the small air holes are introduced. This configuration is similar to an already mentioned variant of a breather according to the invention, which, however, does not explicitly act as an ejector.

This form is particularly appropriate if the inner end face of an ejector is required to be larger than the outer surface of the ejector, so that the ejector, by virtue of a conical design or a stepped, outwardly decreasing diameter in a complementarily shaped opening of the mould, can press against the pressure of the liquid casting material. Since, despite the large number of air holes contained therein, the disc acts as a flow retarder in the air channel, it is physically appropriate to position it at the point of largest diameter of the air channel, that is to say in the inwardly facing portion.

As a manufacturing process for the very small air holes, a laser beam is suitable. Another possibility is sintering or else the combination of sintering with a laser beam.

For casting in and ejecting a cast part out of a casting mould according to the invention, the invention proposes the following process: in the first step, one ejector in each case is pressed into all venting openings from the inside of the mould to the extent that its end face is flush with the inner surface of the mould. In the second step, the moulds are connected together so that they enclose the cavity of the casting mould on all sides. Then in the third step, liquid casting material is injected or pressed in, the air located in the cavity being forced through the air holes and the air channel in each ejector to the outer surface. Subsequently, in the fourth step, the liquid casting material solidifies in the cavity. In the fifth step, all the moulds must be separated from one another and in the sixth step, the cast part that is still in a mould must be ejected, for which purpose appropriate pressure must be exerted on the outer surface of the ejectors.

This pressure can be applied manually—for example by means of a blow with a hammer. In general, however, hydraulic plungers are used for this. Electric motors increasingly drive out the ejectors, for example via spindles. The application of pneumatic cylinders is likewise conceivable.

The principle of a casting mould according to the invention can be used for all casting processes and all casting moulds in which deaeration is necessary during casting or during filling of the mould. As examples, plastic injection moulding, metal injection moulding, metal die casting, thermoset injection moulding, thermoset compression moulding, rubber or gum processing can be mentioned.

Further details and features of the invention are described below with reference to an example. This is not intended to restrict the invention, but only to explain it. In schematic, view:

FIG. 1 shows a section through a casting mould with a breather as ejector

In detail, FIG. 1 shows a section through a casting mould according to the invention. In the exemplary embodiment shown here, it consists of a total of three moulds 1. Of these, the lowest mould 1 is a plate on which a further mould 1 stands, which forms the inner core of the casting mould and an outer mould 1, which forms the upper outer surface 13 of the casting mould and the outer wall of the cavity 2 with the cast part 4 contained therein.

In section, it quickly becomes apparent that the cavity 2 has two dome-like upward protuberances. The inlet cavity 11 opens into the right-hand protuberance, and introduces the liquid casting material 3 into the cavity 2. Within the cavity 2, it also flows into that protuberance of the cast part 4 shown at the left-hand side.

At the upper edge of this protuberance, the deaeration opening 12 can be seen in the uppermost mould 1. It is sealed with a breather 5, at the side of which the air channel 54 leads from the outer surface 53 as far as a cross bore 55, which is oriented transversely to the longitudinal axis of the breather 5. From this cross bore 55, a plurality of small air holes 52 branch off, which extend as far as the end face 51, and produce the connection to the cavity 2.

In FIG. 1, five small air holes 52 are shown in the section of the breather 5. In practice, however, the number of these air holes 52 will be considerably greater, since their diameter in proportion to the size of the breather 5 is considerably small than can be shown diagrammatically in FIG. 1, so that, although air can still pass through the air holes 52, no liquid casting material 3 can enter the air holes 52.

In FIG. 1, it can be very readily seen how air enters from that protuberance of the cast part 4 shown at the left into the air holes 52, collects in the transverse bore 55, from where it flows into the air channel 54 and then escapes to the outside, which is symbolized by a large arrow above the breather 5.

In FIG. 1, the function of the breather 5 for pressing the cast part 4 out of the cavity 2 in the upper mould 1 can be understood. At the upper edge of the casting mould, it can be seen that the breather 5 projects with its outer surface 53 above the outer surface 13 of the upper mould 1. If the moulds 1 are separated from one another and if the cast part 4 still sticks in the upper mould 1, a pressure is exerted on the upwardly facing outer surface 53 of the breather 5, and the cast part 4 is thereby ejected from the mould 1.

LIST OF REFERENCE CHARACTERS

1 Moulds enclose a hollow space, the cavity 2
11 Inlet channel 11 in the mould 1
12 Vent opening in the mould 1
13 Outer face of the mould 1
2 Cavity, hollow space within the adjacent moulds 1
3 Liquid casting material
4 Cast part, in the cavity 2
5 Breather, in the vent opening 12
51 End face of the breather 5, which faces the cavity 2
52 Small air holes in the end face 51
53 Outer surface of the breather 5
54 Air channel, connects the air holes 52 to the outer face 53
55 Cross bore, transverse to the longitudinal axis of the breather 5, connected to the air holes 52 and bounding on the air channel 54

The invention claimed is:

1. A casting mold comprising:
at least two adjoining molds that enclose a hollow cavity, which is accessible from the outside via at least one inlet channel configured to receive liquid casting material to fill the cavity;
at least one vent opening that extends from the cavity to the outer surface of one of the molds approximately in the direction of removal of a solidified cast part; and
a breather that closes the vent opening and includes:
a bolt comprising an end face that faces the cavity, an outer surface, and a bore extending through the bolt near the end face, wherein the bolt is laterally flattened from the bore as far as its outer surface, and this flattening, together with a wall of the vent opening form an air channel; and wherein an elevated pressure or pressure pulse on the outer surface of the breather pushes the breather into the vent opening and the end face into the cast part to eject the cast part; and
air holes extending from the end face to the bore that are permeable to air, but block the liquid casting material; wherein
the bore is a cross-bore extending in a direction transversal to a longitudinal axis of the bolt.

2. The casting mold according to claim 1, wherein the bolt is formed in one piece.

3. The casting mold according to claim 1, wherein the bolt is multipartite in design.

4. The casting mold according claim 1, wherein the air holes have a diameter of less than 0.1 mm.

5. The casting mold according to claim 1, wherein the air holes have a diameter of about 30 μm.

6. The casting mold according to claim 1, wherein numerous air holes are connected to an air channel, which leads to the outer surface of the breather.

7. The casting mold according to claim 1, wherein the end face is larger than the outer surface of the breather.

8. The casting mold according to claim 1, wherein the end face has the same shape and size as the outer surface of the breather.

9. The casting mold according to claim 1, wherein the end face is smaller than the outer surface of the breather.

10. The casting mold according to claim 1, wherein the air holes have been produced by means of a laser beam.

11. The casting mold according to claim 1, wherein the air holes have been produced by sintering a metal.

* * * * *